(12) United States Patent
Kundu et al.

(10) Patent No.: US 10,484,300 B2
(45) Date of Patent: *Nov. 19, 2019

(54) ADMISSION CONTROL BASED ON THE END-TO-END AVAILABILITY

(71) Applicant: International Business Machines Corporation, Armonk, NY (US)

(72) Inventors: Ashish Kundu, Elmsford, NY (US); Ruchi Mahindru, Elmsford, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/146,229

(22) Filed: May 4, 2016

(65) Prior Publication Data
US 2016/0248699 A1   Aug. 25, 2016

Related U.S. Application Data

(63) Continuation of application No. 14/303,038, filed on Jun. 12, 2014, now Pat. No. 9,367,384.

(51) Int. Cl.
*G06F 11/00* (2006.01)
*H04L 12/927* (2013.01)
(Continued)

(52) U.S. Cl.
CPC ........ *H04L 47/801* (2013.01); *G06F 11/0715* (2013.01); *G06F 11/0793* (2013.01);
(Continued)

(58) Field of Classification Search
CPC . H04L 47/801; H04L 47/829; H04L 41/5038; H04L 41/5054; H04L 41/5025;
(Continued)

(56) References Cited

U.S. PATENT DOCUMENTS

| 5,347,511 | A | * | 9/1994 | Gun | .................... H04L 12/5602 370/255 |
| 5,781,632 | A |  | 7/1998 | Odom | |

(Continued)

OTHER PUBLICATIONS

IBM, "An Analytic Capacity Planning, Performance and Cost Modeling Technique for Cloud Computing Environment"; An IP.com Prior Art Database Technical Disclosure, Dec. 8, 2009, pp. 1-6.

(Continued)

*Primary Examiner* — Anthony J Amoroso
(74) *Attorney, Agent, or Firm* — Scully, Scott, Murphy & Presser, P.C.; Samuel A. Waldbaum, Esq.

(57) ABSTRACT

Providing admission control for a request may comprise creating a process flow associated with the request, the process flow identifying a plurality of computer-implemented components and a flow of transactions occurring between the computer-implemented components; executing the flow of transactions on the plurality of computer-implemented components; monitoring the flow of transactions to detect a problem in the flow; responsive to not detecting a problem in the flow, allowing the request to proceed; and responsive to detecting a problem in the flow, not allowing the request to proceed.

19 Claims, 6 Drawing Sheets

(51) Int. Cl.
*G06F 11/07* (2006.01)
*G06F 11/30* (2006.01)
*H04L 12/24* (2006.01)
*H04L 12/26* (2006.01)
*H04L 12/911* (2013.01)
*H04L 29/08* (2006.01)

(52) U.S. Cl.
CPC .......... *G06F 11/30* (2013.01); *H04L 41/5038* (2013.01); *H04L 41/5054* (2013.01); *H04L 43/026* (2013.01); *H04L 47/829* (2013.01); *H04L 67/10* (2013.01); *H04L 41/5025* (2013.01)

(58) Field of Classification Search
CPC .... H04L 43/026; H04L 67/10; G06F 11/0715; G06F 11/0793; G06F 11/30; G06F 11/0712; G06F 11/0751; G06N 5/02; G06N 5/04
See application file for complete search history.

(56) References Cited

U.S. PATENT DOCUMENTS

| | | | |
|---|---|---|---|
| 6,219,706 B1 * | 4/2001 | Fan | H04L 63/0254 709/225 |
| 7,243,351 B2 | 7/2007 | Kundu | |
| 7,986,625 B2 | 7/2011 | Chase et al. | |
| 8,447,851 B1 | 5/2013 | Anderson et al. | |
| 8,560,887 B2 | 10/2013 | Behrendt et al. | |
| 9,071,611 B2 * | 6/2015 | Yadav | H04L 63/0227 |
| 2008/0225889 A1 * | 9/2008 | Truong | H04L 45/00 370/468 |
| 2012/0005330 A1 | 1/2012 | Moran et al. | |
| 2013/0031136 A1 | 1/2013 | Shah | |
| 2013/0031559 A1 | 1/2013 | Alicherry | |
| 2013/0117806 A1 | 5/2013 | Parthasarathy et al. | |

OTHER PUBLICATIONS

IBM, "Method of creating a componentized architecture for unifying resource sharing scenarios in Cloud Computing environment"; An IP.com Prior Art Database Technical Disclosure, Feb. 11, 2010, pp. 1-13.

Xia, Z., et al., "A Distributed Admission Control Model for QoS Assurance in Large-Scale Media Delivery Systems", IEEE Transactions on Parallel and Distributed Systems, Dec. 2005, vol. 16, No. 12.

Breslau, L., et al., "Comments on the Performance of Measurement-Based Admission Control Algorithms", INFOCOM 2000, Nineteenth Annual Joint Conference of the IEEE Computer and Communications Societies, Proceedings, IEEE, Mar. 2000, pp. 1233-1242, vol. 3.

Gawlick, R., et al., "Routing and Admission Control in General Topology Networks", Stanford University, Department of Computer Science, Apr. 24, 1995, 8 pages.

\* cited by examiner

ADMISSION CONTROL BASED ON THE END-TO-END AVAILABILITY

FIELD

The present application relates generally to computers, and computer applications, and more particularly to admission control for a computing request to be processed based on end-to-end availability.

BACKGROUND

Traditionally, admission control is only considered frequently if there is sufficient capacity on the destination server. Provisioning or other tasks in a cloud environment are complex, and there are many complex tools integrated together to automate the operations. This requires integration of several tools and components within the tools, interacting with each other, and passing requests from the user interface down to the control manager tools. The components of a tool may run on different server or on the same server. In highly automated many-step processes also, management system is the cause for majority of problem tickets. For example, automated information technology (IT) management systems may be utilized in running cloud computing and data centers. Automation of many complex integrations create potential for many failure points.

For instance, for a virtual machine (VM) to be provisioned in a virtual environment, or cloud environment, there are many requirements which need to be fulfilled for a request to be satisfied, such as updating different tools, issuing different requests between various management tools which can be located on different physical servers, working network and authentication/valid credentials between servers and running tools, and available resources within each tool. Hence also, there may be a potential for many points of failures. The interaction between tools can be broken due to multiple reasons; For example, if network connection between the tools is not operational, if credentials for authentication between different tools and/or servers expired, critical process is down, and/or there are corrupted configurations, the request will fail, even if there are sufficient resources on the target server to provision a VM.

BRIEF SUMMARY

A method for providing admission control associated with a request in a computer system, in one aspect, may comprise creating a process flow associated with the request, the process flow identifying a plurality of computer-implemented components and a flow of transactions occurring between the computer-implemented components. The method may also comprise executing the flow of transactions via the plurality of computer-implemented components. The method may also comprise monitoring the flow of transactions to detect a problem in the flow. The method may further comprise responsive to not detecting a problem in the flow, allowing the request to proceed. The method may also comprise responsive to detecting a problem in the flow, not allowing the request to proceed.

A system for providing admission control associated with a request in a computer system, in one aspect, may comprise a hardware processor and a storage device storing a plurality of topologies associated with a plurality of requests respectively, a plurality of process patterns associated with the plurality of requests respectively, and configurations of computer-implemented components. The hardware processor may be operable to create a process flow associated with the request, the process flow identifying a plurality of the computer-implemented components and a flow of transactions occurring between the computer-implemented components in fulfilling the request based on the topology associated with the request and the process pattern associated with the request. The hardware processor may be further operable to execute the flow of transactions via the plurality of computer-implemented components. The hardware processor may be further operable to monitor the flow of transactions to detect a problem in the flow. Responsive to not detecting a problem in the flow, the hardware processor may be further operable to allow the request to proceed, and responsive to detecting a problem in the flow, the hardware processor may not allow the request to proceed.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
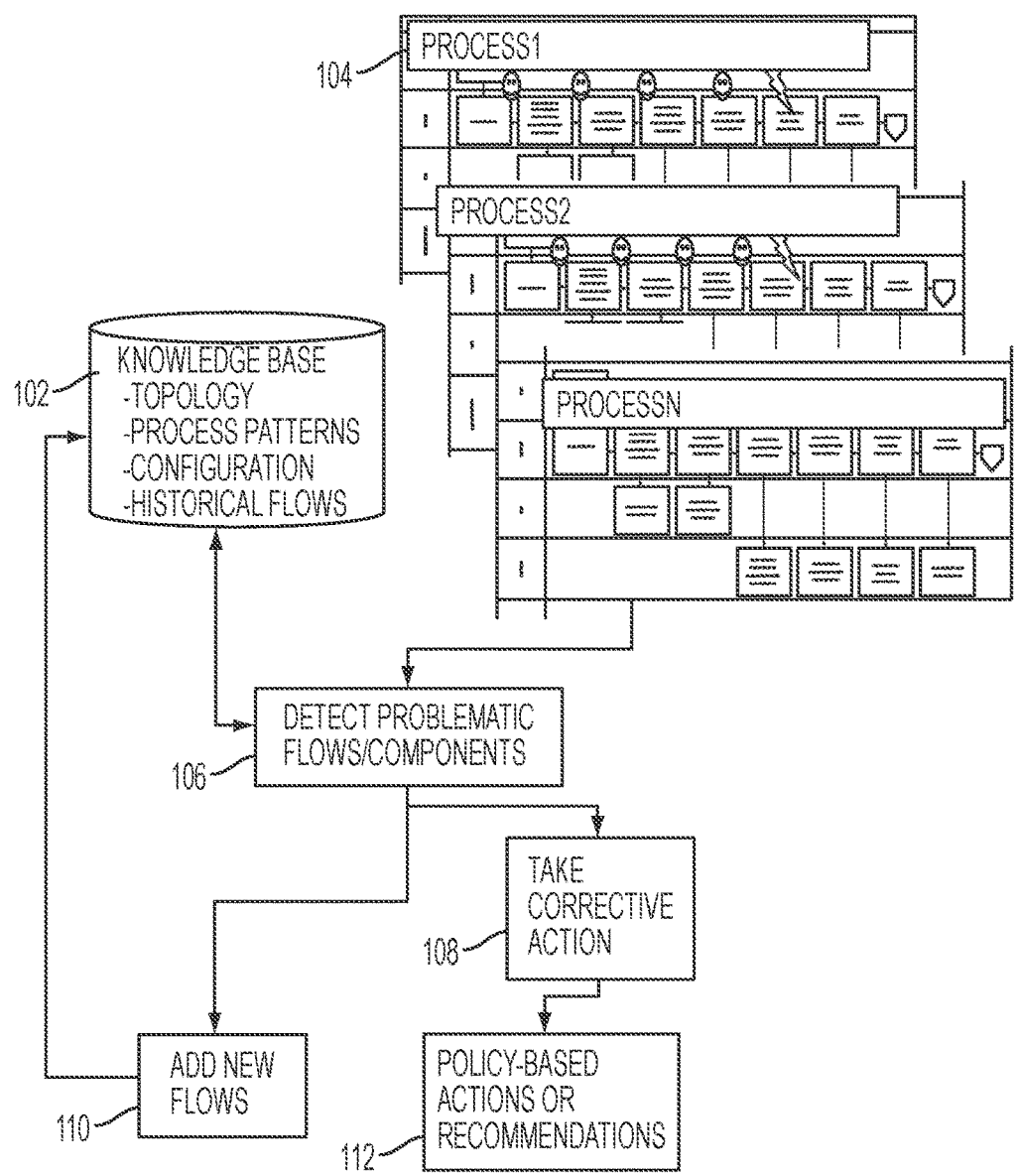
FIG. 1 is a block diagram illustrating an Admission Control Monitoring Orchestrator (ACMO) in one embodiment of the present disclosure.

In one embodiment of the present disclosure, an end-to-end verification may be provided that checks whether a request will have its prerequisites met successfully. Before a request is issued, a verification of prerequisites needed, such as interconnections, credentials, and firewalls is checked by an automatic prerequisites checker agent. In one embodiment of the present disclosure, only if all prerequisites are met, the request is issued. Otherwise, the request may be queued.

Thus in one aspect, admission control may be provided based on determining whether a request would be processed or not in completeness. A methodology for providing the admission control in one embodiment may comprise receiving a request for admission control, determining a dependency flow, and based on the dependency flow, determining whether any of the links based on dependencies have any failures or high load or another condition that would fail, and if so, the request may be rejected. Otherwise, the request may be allowed to proceed.

Examples of failure conditions that may be detected may include one or more of the following, but not limited only to those examples:

If there is high load at a component or service, check whether that condition will persist until this request reaches that component or service. If no, check other conditions. If yes, drop this request or throttle the request for a defined time period.

If there is a password failure, drop request, otherwise proceed.

If there is a certificate expiration or certificate not being accepted and it is leading to link failure, drop or queue the request.

If there is a secure shell (SSH) key failure or the security service required is not available, drop or queue the request.

If the communication channel requested is not secure or reliable, drop or queue the request.

If the firewall is not allowing requests, drop or queue the request.

For other conditions to be checked, if failure is detected, drop or queue the request Based on determining that there are no failure conditions, the request is allowed. On the other hand, requests that are queued due to detection of a failure condition during the check may be retried when the failure condition is restored. In another aspect, the queued request may be retried based on a predetermined frequency for sending a request for processing, e.g., every predetermined period.

In one embodiment of the present disclosure, preventive checking of the health of the system may be performed, for example, using knowledge of the steps of the process needed, components needed, and their interdependency. The knowledge may be a priori or learned. Correct system configuration may be verified to proactively identify and prevent any problems before they surface. For example, problems may be proactively identified before they surface by checking the health indicators of the system, checking that prerequisites for system actions are fulfilled, and performing predictive analysis based on events. In one aspect, a methodology for preventive checking may be highly automated.

FIG. 1 is a block diagram illustrating an Admission Control Monitoring Orchestrator (ACMO) in one embodiment of the present disclosure. Such end-to-end monitoring may be performed in complex flows of highly automated environment. Knowledge base 102 may include topology associated with a request or a class of requests, for example, a dependency diagram that connects components involved in processing the request. Such dependency diagram may be discovered based on monitoring transactions at fine grained levels that occur between the components or interactions between the components during processing of the request, for example, a path followed for performing the request. Known discovery tools may be used to build such topology. In another aspect, such topology associated with a request or a class of requests may be obtained based on prior knowledge. The knowledge base 102 may also contain process patterns associated with requests, for example, actual invocations performed for processing a request, which components are touched, the processing time for performing the request, and the resources required to perform the request. The process pattern information may be learned based on observing previously run requests, or may be obtained from prior knowledge. The knowledge base 102 may further include configuration information about the resources used in processing the request, for example, central processing unit (CPU) information, memory, other resources, configuration of the server and middleware used to fulfill the request. Historical flows are snapshots of processes invoked during the process 104 runs. The knowledge base 102 stores topology, process patterns, configuration and historical flows for a plurality of different requests.

Based on the information stored in the knowledge base 102, one or more requests 104 and thus process patterns associated with the requests are simulated. For instance, provisioning of a virtual machine is an example of a request. In that example, a process pattern (e.g., shown as 104) for a virtual machine provisioning request may be simulated based on the corresponding process pattern information available in the knowledge base 102. Thus, process specific monitoring and diagnosis patterns may be developed. One or more simulated process patterns 104 are run. Based on the simulated runs of the process patterns 104, problematic flow or component is detected at 106. For instance, problematic flows and components may be observed during the running of the one or more simulated processes 104. Examples of the problematic flows may include the above-described failure conditions. Thus, using the dependency across components stored in the knowledge base, admission control monitoring may be performed by developing process specific monitoring and diagnosis patterns. In that way, the health of the components in the critical path of these processes may be validated through proactive monitoring. Proactive capacity and performance monitoring of the resources may be provided that are critical for fulfillment of each process flow. The behavior of existing requests may be closely logged (e.g., as historical flows) and analyzed to certify process component health and identify incorrectly configured components.

One or more corrective actions may take place (e.g., 108) responsive to detecting problematic flows or components. It may be discovered by running the simulated processes (104) that certain configuration always causes failure, e.g., that configuration does not provide enough resources. A corrective action in that scenario may be to add a node or more processing capacity (e.g., add another CPU, storage, etc.). As another example, a corrective action may involve upgrading packages or applying fix packs due to code bugs that may be causing the resource bottleneck. As another example, a corrective action may be a temporal type of action. For instance, responsive to determining that there is a background backup process or another process running at certain time, which causes bottleneck or another problem, the background process may be rescheduled to another time. Policy-based actions or recommendations may be presented (e.g., 112). In another aspect, remediation that is responsive to detecting a problem may also include recommending a stable restart point in the process such that the process need not be restarted from the beginning.

The new process flows (e.g., process invocation) or snapshot of the flow of the run process (e.g., 104) may be added (e.g., 110) to the knowledge base 102. The added flows 110 stored in the knowledge base 102 may be then used to further learn process patterns, dependencies and interactions between components used in processing a request, e.g., transactions occurring at a fine grained level. For example, if a particular component is known to have performance bottlenecks then the newly added flows will submit additional transactions that would be require to be processed through that particular component to proactively check any potential bottleneck.

The simulated transactions (104) that are run and the recommended remediation actions ensure that end-to-end completeness can be achieved for a real request and its process flow. The end-to-end flow monitoring and providing corrective actions, e.g., if needed, shortens diagnostic time and reduces cost. For instance, approximately problem tickets in a fully automated system may be caused due to a component failure on the critical path. The methodology of the present disclosure may reduce the number of management system tickets that get issued, and also help with complex failures, which take the most time to diagnose and repair.

Figure 2:
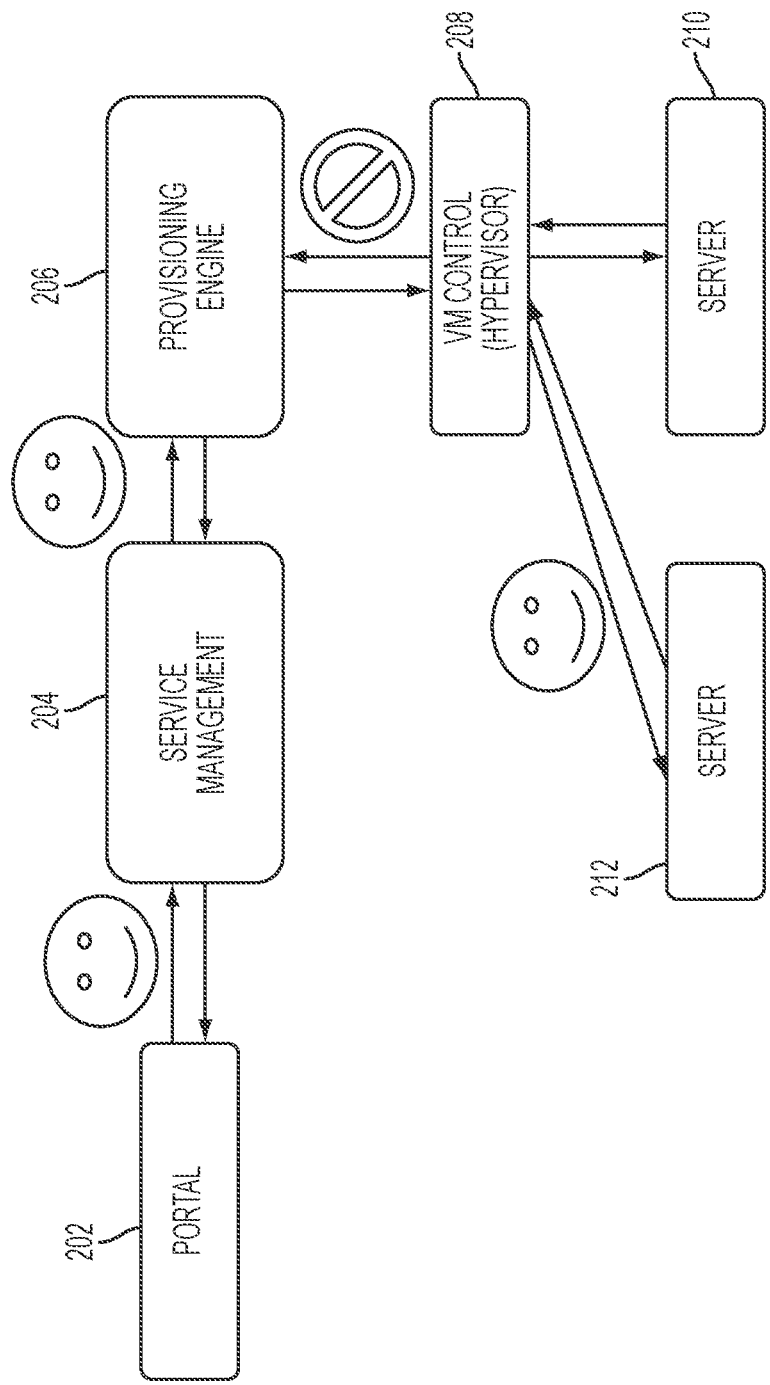
FIG. 2 is illustrates example components involved in processing a request.

FIG. 2 is illustrates example components involved in processing a request in one embodiment of the present disclosure. An example request may be VM provisioning. A portal 202 provides a user interface that allows a user to specify the request. The user's request is communicated to an integrated service management (ISM) tool 204 for preparation of deploying a virtual machine. Service Management 206 communicates with the Provisioning Engine or the like tool for setting up deployment of a virtual machine, for example, a VMControl 208 to manage the hypervisor and LPARs provisioned on the hypervisor, and one or more logical partitions (LPARs) 210, 212 managed by 208. A methodology of the present disclosure in one embodiment monitors detailed transactions occurring between the components (e.g., 202, 204, 206, 208, 210, 212) to check the health of the overall system for fulfilling the request. For example, the following prerequisites may be checked: network paths, whether credentials are valid, whether firewall rules are respected, whether the needed tools are running, and whether there are sufficient resources to fulfill the request. If a prerequisite is not satisfied, the overall request will fail and determining the cause for failure is a time consuming task. By performing integrated monitoring across the components via a process-oriented monitoring and availability health-check methodology of the present disclosure, common forms of failures may be reduced and substantial savings in time and cost may be achieved.

In one aspect of the methodology of the present disclosure, event logging is performed to provide failure detection and corrective action recommendation. In addition to the standard tool logs, custom logs may be added for each step of a process, so that it can be determined if it fails and at which step it failed. A monitoring agent installed on each of the components shown in the process flows shown in 104 may observe and collect the logs. The logs may be used to pinpoint the failed step. Logging the progress of each step may shorten diagnostic time, reduce cost and enable recovery.

Figure 3:
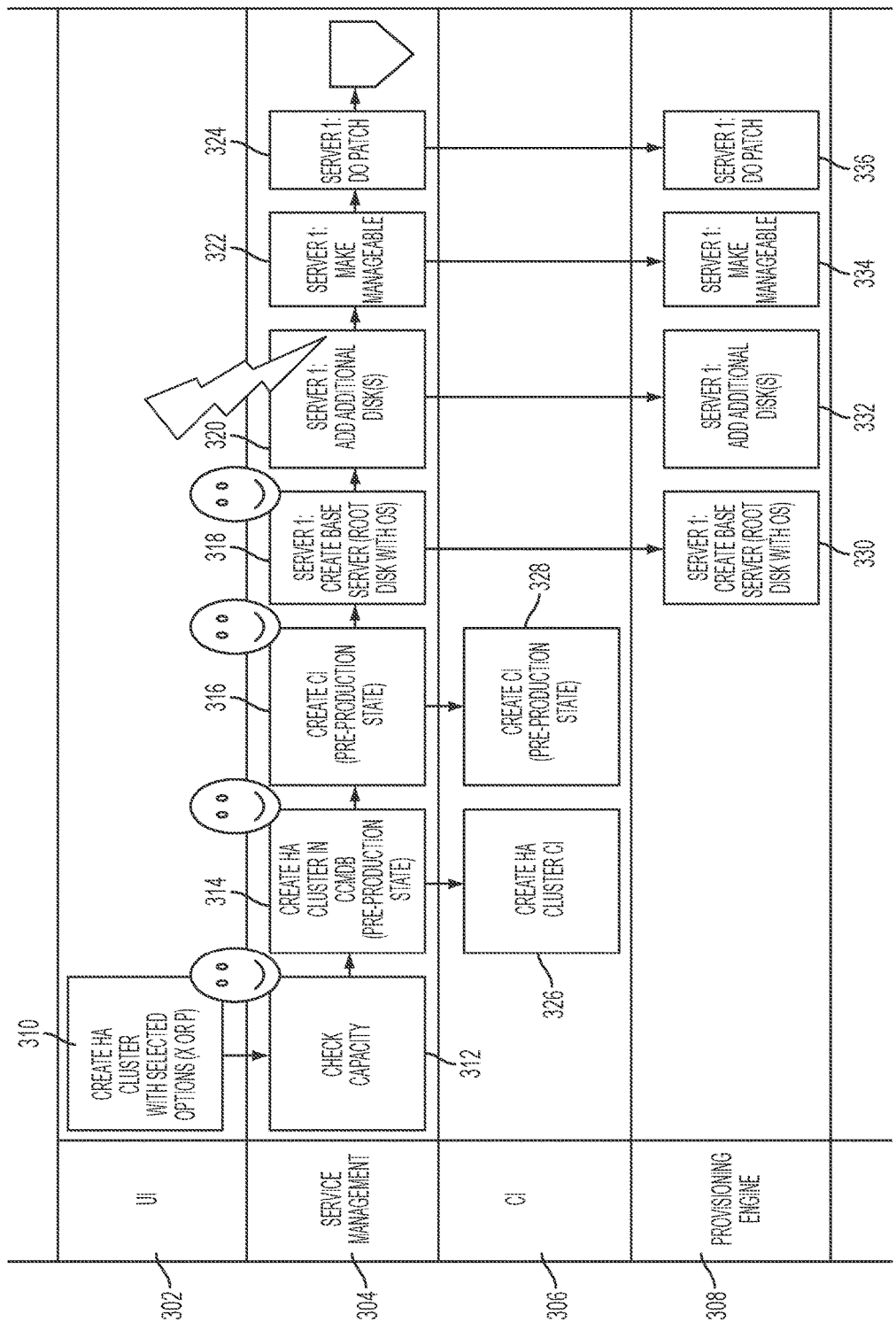
FIG. 3 illustrates another example of transactions that may be monitored via a process simulation of a request.

FIG. 3 illustrates another example of transactions that may be monitored via a process simulation of a request in one embodiment of the present disclosure. The components shown 302, 304, 306, 308 perform one or more transactions (e.g., invokes actions), and the transactions are monitored via a methodology of the present disclosure in one embodiment. In this example request, a user interface component 302 may receive a request to create High Availability (HA) cluster via selected options (e.g., selecting a type of processor system). This request is communicated to a service management tool 304. The service management tool 304 may check for capacity 312, and if successful, HA cluster may be created 314. Further, Configuration Item (CI) may be created 315. Another processing step may be to create a base server 318, e.g., root disk with an operating system. Yet another processing step may be adding one or more disks 320. Still another processing step may be to make the server manageable 322. Another processing step may be to perform server patch 324. Further, in creating HA cluster 314, another transaction may take place to create HA cluster 326. Similarly, in creating CI 316, a transaction may be invoked to create CI 328. In creating a base server, Service Management 304 may invoke Provisioning Engine to create the server 330. Similarly, Service Management 304 may communicate with Provisioning Engine 308 to add additional disks 332. Likewise, Service Management 304 may invoke Provisioning Engine functionality to make the server manageable 334. Service Management 304 may also request that Provisioning Engine 308 perform server patch 336.

The methodology of the present disclosure in one embodiment monitors each processing stage and logs the flows and events.

Figure 4:
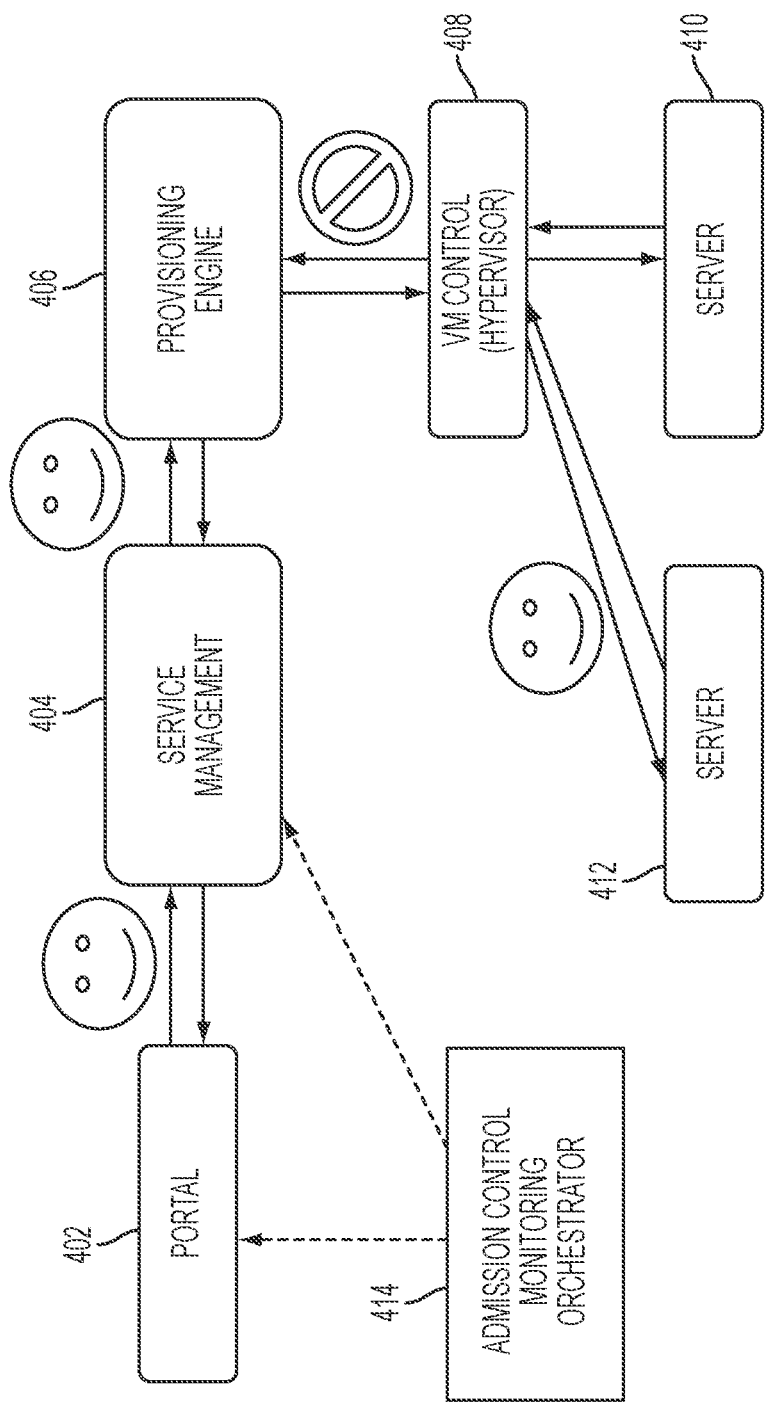
FIG. 4 illustrates a monitoring agent of the present disclosure in one embodiment monitoring and logging transactions occurring between components.

FIG. 4 illustrates a monitoring agent of the present disclosure in one embodiment monitoring and logging transactions occurring between components. One or more monitoring agents used by an Admission Control Monitoring Orchestrator (ACMO) 414 may be a computer-implemented program of instructions that execute instructions on one or more processors to achieve a methodology of the present disclosure. ACMO 414 for example may perform the processing described with reference to FIG. 1. The ACMO 414 may simulate a process flow for fulfilling a received request. Consider for example a virtual machine provisioning request. The ACMO 414 may create a simulated process flow for VM provisioning, and execute the process flow, e.g., a sequence of actions to be performed on different components for fulfilling this request may be created and performed. All transactions occurring between components involved in this process flow and the results of the transactions may be logged. The Admission Control Monitoring Orchestrator (ACMO) 414 may leverage existing monitoring agents provided by tools like IBM Tivoli Monitoring from International Business Machines Corporation (IBM)®, Armonk, N.Y., Ganglia Monitoring System, Nagios™ or BMC Patrol™. The Admission Control Orchestrator 414 may perform processing on different types of data collected by the monitoring agent, such as logs, server utilization, transaction failure rate, e.g., whether the transaction is successful or not successful, perform health check, availability check, configuration check, security and compliance checks. In addition, the ACMO 414 may take into account the environmental changes like tool upgrades, configuration changes, operating system (OS) updates, and/or others. Thus, e.g., in this example, transactions occurring between a portal 402 and Service Management 404, Service Management 404 and Provisioning Engine 408, Provisioning Engine and Hypervisor 408, Hypervisor 408 and one or more servers 410, 412 may be monitored and logged.

In one embodiment of the present disclosure, the simulated process flow associated with a request may be run periodically, or just before needed, or as needed. Configuration checking for high availability may include determining whether components are configured appropriately.

Figure 5:
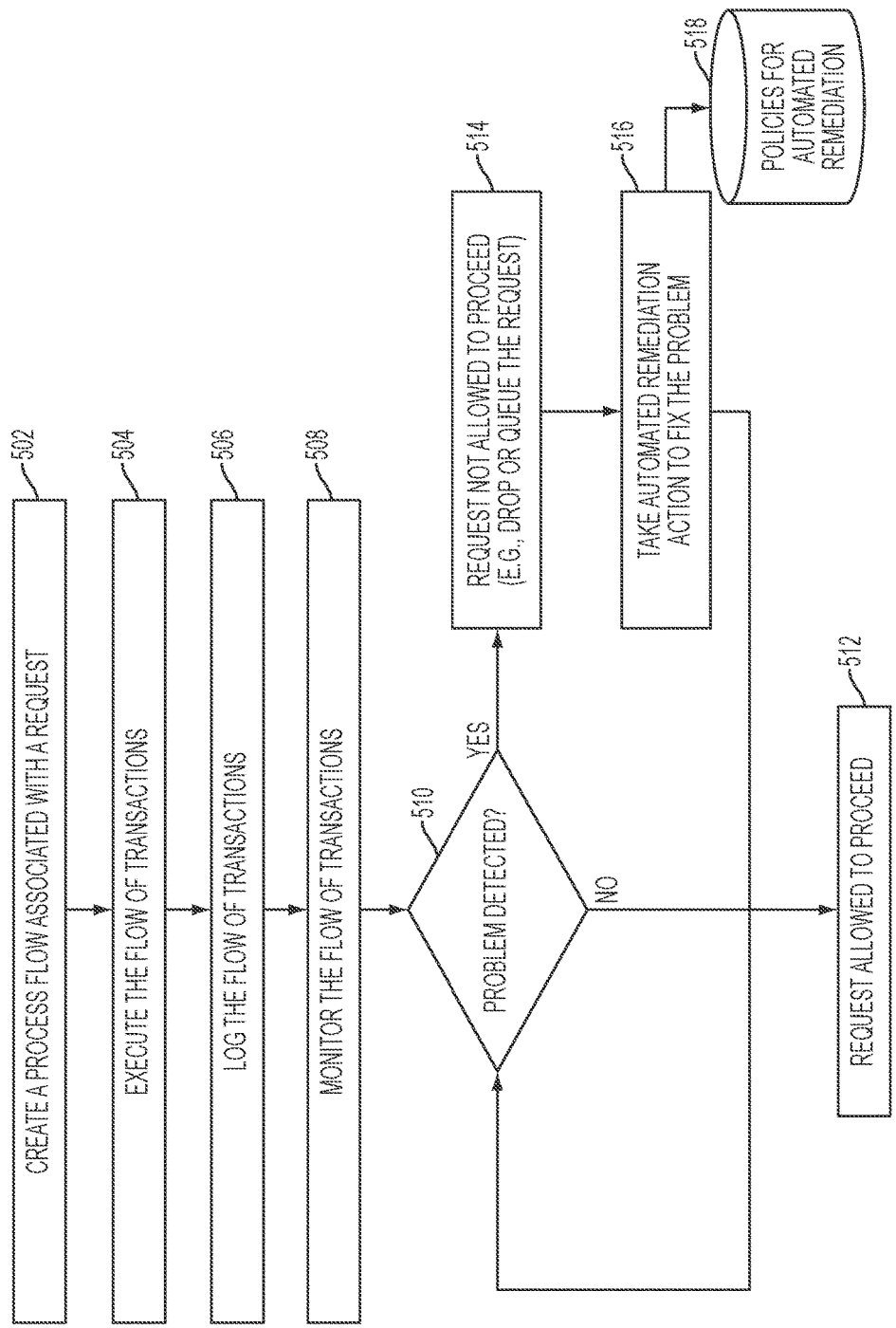
FIG. 5 is a flow diagram illustrating a method of the present disclosure in one embodiment.

FIG. 5 is a flow diagram illustrating a method of the present disclosure in one embodiment for providing admission control associated with a request. At 502, a process flow associated with the request is created. The process flow identifies a plurality of computer-implemented components and a flow of transactions occurring between the computer-implemented components performed to fulfill the request. The process flow may be created based on a knowledge base that stores a topology associated with the request, a process pattern associated with the request, configuration of the plurality of computer-implemented components. Such knowledge base may store multiple topologies, e.g., one for corresponding to a class of requests or a request, multiple process patterns, e.g., one for corresponding to a class of requests or a request, configuration associated system components, e.g., hardware configuration, middleware configuration, etc.

At 504, the flow of transactions is executed via the plurality of computer-implemented components on periodic basis to proactively detect and remediate issues that may exist.

At 506, the flow of transactions is logged. For instance, every invocation that takes place may be logged with inputs, outputs and result of the invocation.

At 508, the flow of transactions is monitored to detect a problem in the flow or one or more of the components, or combination thereof. For instance, an agent process may monitor the execution status of a transaction executed as another process or thread, and the outcome of the transaction execution may be captured by the agent process.

At 510, it is determined whether a problem is detected in the flow or one or more of the components. For instance, an invocation of a transaction may output an error status. If no problem is detected, the request is allowed to proceed at 512. Otherwise, at 514, the request is not allowed to proceed. In this case, the request may be queued and retried at a later time.

At 516, after a problem is detected, automated remediation action may be taken to resolve the issue based on the rules and policies stored in 518.

The execution details of the invoked transactions during the flow of transactions may be also stored as a snapshot in the knowledge base. Such history of invoked transactions may be used to learn the behavior of the processes and the components that are involved in running the processes. Based on the learning the monitoring instrumentation and remediation may be modified or updated. For example, if the request continues to fail at a particular step that may be related to a configuration change like marking a file as read-only where it should be read-write due to a recent upgrade, the monitoring of the present disclosure in one embodiment can be extended to ensure that this configuration step is modified. Additionally, the privileges can be automatically updated on the file as a remediation step, if similar issue is encountered again.

Thus, for example, if a problem is detected, a corrective action may be taken or recommended. A corrective action may be taken based on one or more policies and environmental changes, for example, responsive to detecting a problem in the flow and/or one or more of the components. The processing shown in FIG. 5 may be performed periodically or before a real request is to be processed.

Examples of a request may include, but are not limited to, provisioning a virtual or physical machine in a cloud environment, another action that involves processing of automated transaction on a server, e.g., one or more of adding memory, adding a central processing unit, adding a disk, applying patching, and/or others.

Figure 6:
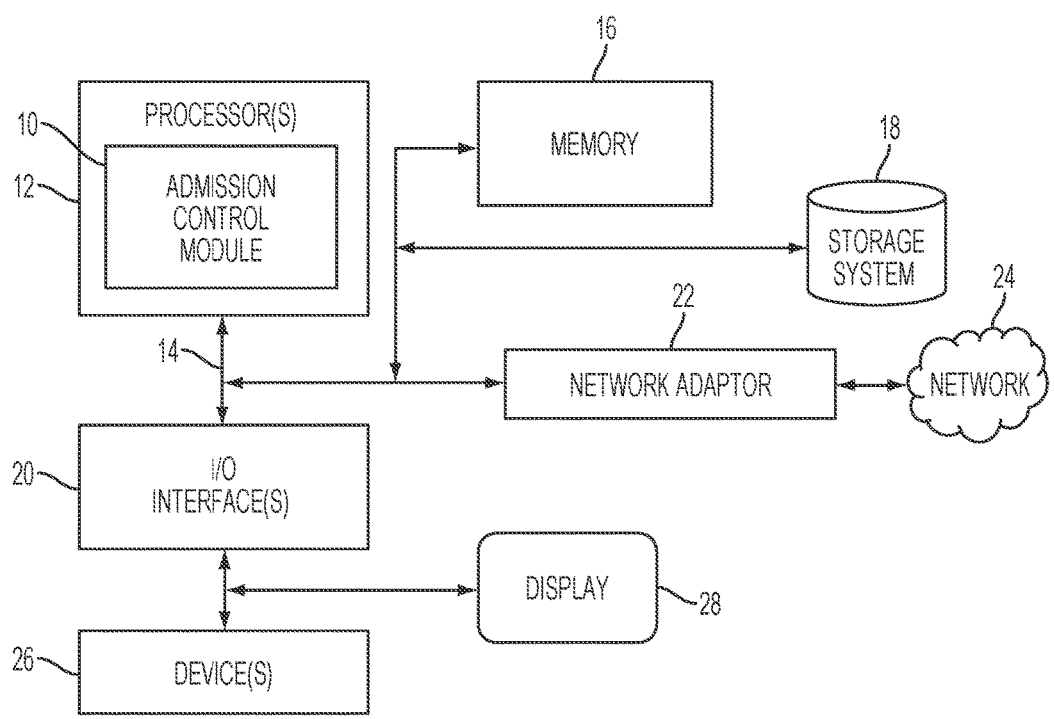
FIG. 6 illustrates a schematic of an example computer or processing system that may implement the admission control system in one embodiment of the present disclosure.

FIG. 6 illustrates a schematic of an example computer or processing system that may implement the admission control system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for providing admission control associated with a request in a computer system, comprising:
    creating, by a processor, a process flow associated with the request, the process flow identifying a plurality of computer-implemented components and a flow of transactions occurring between the computer-implemented components, the process flow further identifying dependency in the process flow;
    executing the flow of transactions via the plurality of computer-implemented components identified in the process flow;
    monitoring the flow of transactions to detect a problem in the process flow and in at least one of the plurality of computer-implemented components via which the flow of transactions is executed, wherein transactions occurring between the computer-implemented components in the process flow are monitored, wherein a determination is made of whether the request can be completely processed without a problem in the process flow, the determination including at least determining whether a link in the dependency has a failure;
    responsive to determining the request can be completely processed without a problem in the process flow, allowing the request to proceed; and
    responsive to detecting a problem in the process flow, not allowing the request to proceed.

2. The method of claim 1, wherein the process flow is created based on a knowledge base that stores a topology associated with the request, a process pattern associated with the request, and configuration of the plurality of computer-implemented components.

3. The method of claim 2, wherein the knowledge base stores multiple topologies and multiple process patterns, wherein a topology corresponds to a class of requests and a process pattern corresponds to the class of requests.

4. The method of claim 1, further comprising logging the flow of transactions and updating the process flow based on the logging of the flow of transactions.

5. The method of claim 1, further comprising taking a corrective action based on one or more policies and environmental changes responsive to detecting a problem in the process flow.

6. The method of claim 1, wherein the request comprises a request to provision a virtual or physical machine in a cloud environment or another action that involves processing of automated transaction on the server comprising one or more of adding memory, adding a central processing unit, adding a disk, and applying patching.

7. The method of claim 1, wherein the method is performed periodically.

8. The method of claim 1, wherein the monitoring the flow of transactions to detect a problem in the process flow comprises:
    checking whether a load at a computer-implemented component will persist until the request reaches the computer-implemented component, and responsive to determining that the load at a computer-implemented component will persist, at least one of dropping the request and queuing the request;
    checking whether a password failure has occurred, and responsive to determining that the password failure has occurred, at least one of dropping the request and queuing the request;
    checking whether a certificate has expired, and responsive to determining that the certificate has expired, at least one of dropping the request and queuing the request;
    checking whether a security service is not available, and responsive to determining that the security service is not available, at least one of dropping the request and queuing the request;
    checking whether a communication channel request is not secure, and responsive to determining that the communication channel request is not secure, at least one of dropping the request and queuing the request; and
    checking whether a firewall is not allowing the flow of transactions, and responsive to determining that the firewall is not allowing the flow of transactions, at least one of dropping the request and queuing the request.

9. A computer readable storage medium storing a program of instructions executable by a machine to perform a method of providing admission control associated with a request in a computer system, the method comprising:
    creating a process flow associated with the request, the process flow identifying a plurality of computer-implemented components and a flow of transactions occurring between the computer-implemented components, the process flow further identifying dependency in the process flow;
    executing the flow of transactions via the plurality of computer-implemented components identified in the process flow;
    monitoring the flow of transactions to detect a problem in the process flow and in at least one of the plurality of computer-implemented components via which the flow of transactions is executed, wherein transactions occurring between the computer-implemented components in the process flow are monitored, wherein a determination is made of whether the request can be completely processed without a problem in the process flow, the determination including at least determining whether a link in the dependency has a failure;

responsive to determining the request can be completely processed without a problem in the process flow, allowing the request to proceed; and responsive to detecting a problem in the process flow, not allowing the request to proceed.

10. The computer readable storage medium of claim 9, wherein the process flow is created based on a knowledge base that stores a topology associated with the request, a process pattern associated with the request, and configuration of the plurality of computer-implemented components.

11. The computer readable storage medium of claim 10, wherein the knowledge base stores multiple topologies and multiple process patterns, wherein a topology corresponds to a class of requests and a process pattern corresponds to the class of requests.

12. The computer readable storage medium of claim 9, further comprising logging the flow of transactions and updating the process flow based on the logging of the flow of transactions.

13. The computer readable storage medium of claim 9, further comprising taking a corrective action based on one or more policies and environmental changes responsive to detecting a problem in the process flow.

14. The computer readable storage medium of claim 9, wherein the request comprises one or more of a request to provision a virtual or physical machine in a cloud environment or another action involving processing of automated transaction on a server comprising adding memory, adding a central processing unit, adding a disk, and applying patching.

15. The computer readable storage medium of claim 9, wherein the method is performed periodically.

16. A system for providing admission control associated with a request in a computer system, comprising:

a hardware processor;

a storage device storing a plurality of topologies associated with a plurality of requests respectively, a plurality of process patterns associated with the plurality of requests respectively, and configurations of computer-implemented components, the hardware processor operable to create a process flow associated with the request, the process flow identifying a plurality of the computer-implemented components and a flow of transactions occurring between the computer-implemented components in fulfilling the request based on the topology associated with the request and the process pattern associated with the request, the process flow further identifying dependency in the process flow, the hardware processor further operable to execute the flow of transactions via the plurality of computer-implemented components identified in the process flow, the hardware processor further operable to monitor the process flow of transactions to detect a problem in the process flow and in at least one of the plurality of computer-implemented components via which the flow of transactions is executed, wherein transactions occurring between the computer-implemented components in the process flow are monitored, wherein a determination is made of whether the request can be completely processed without a problem in the process flow, the determination including at least determining whether a link in the dependency has a failure, responsive to determining the request can be completely processed without a problem in the process flow, the hardware processor further operable to allow the request to proceed, and responsive to detecting a problem in the process flow, the hardware processor not allowing the request to proceed.

17. The system of claim 16, wherein the hardware processor further updates the process flow based on the logging of the flow of transactions.

18. The system of claim 16, wherein the hardware processor is further operable to take a corrective action based on one or more policies and environmental changes responsive to detecting a problem in the process flow.

19. The system of claim 16, wherein the request comprises one or more of a request to provision a virtual or physical machine in a cloud environment or another action that involves processing of automated transaction on a server comprising adding memory, adding a central processing unit, adding a disk, and applying patching.

* * * * *